Nov. 29, 1960   B. R. EICHBAUM ET AL   2,961,709
METHOD OF FABRICATING SPECIAL SHAPED FERRITES
Filed Dec. 16, 1957
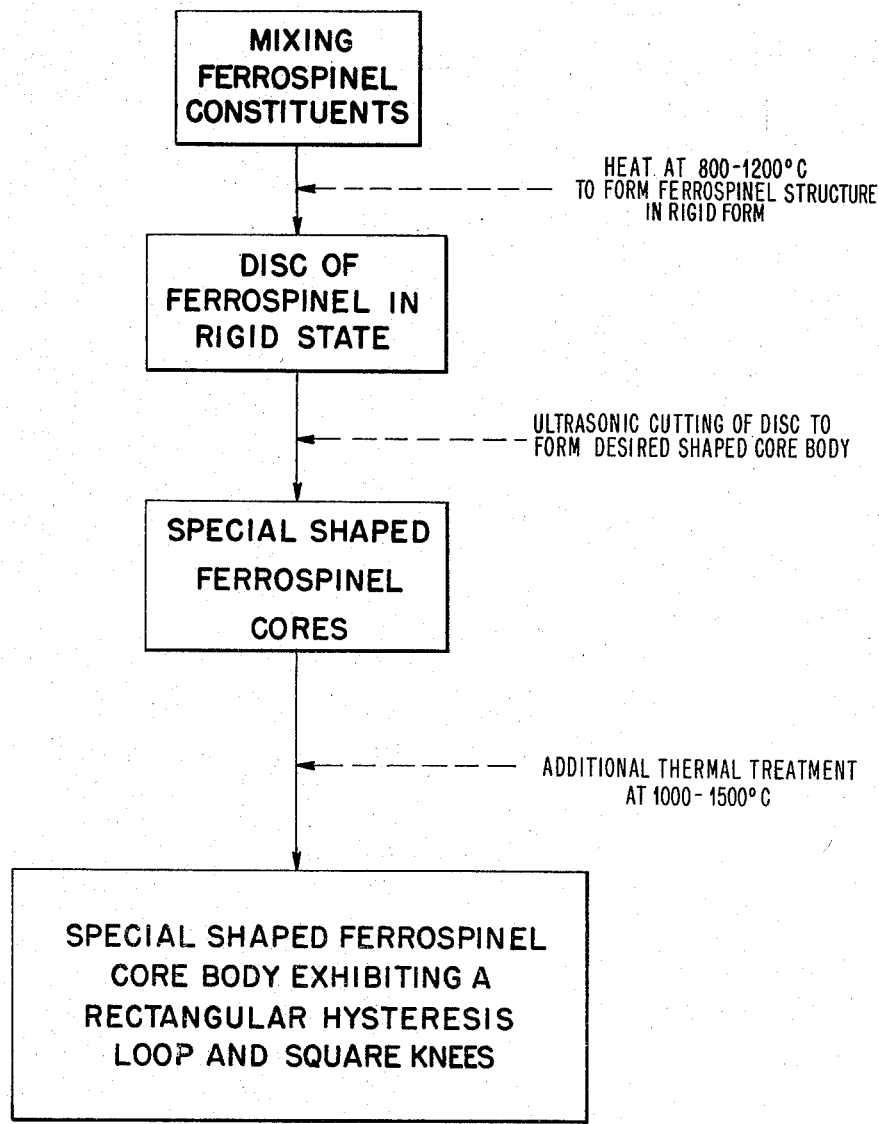
INVENTORS
BARLANE R. EICHBAUM
ERNEST C. SCHUENZEL
BY William V. Schelberg
AGENT

United States Patent Office 2,961,709
Patented Nov. 29, 1960

2,961,709

METHOD OF FABRICATING SPECIAL SHAPED FERRITES

Barlane R. Eichbaum and Ernest C. Schuenzel, Poughkeepsie, N.Y., assignors to International Business Machines Corporation, New York, N.Y., a corporation of New York Filed Dec. 16, 1957, Ser. No. 702,830

6 Claims. (Cl. 18—47.5)

This invention relates to those ferromagnetic substances known as ferrospinels and in particular to an improved method of fabricating such materials. More particularly, it relates to a method of improving the magnetic characteristics of these materials so as to make them more suitable for use in memory type mechanisms.

The usual method of fabricating ferrites involves compressing the metal oxide powders in a die and plunger to form a solid body of desired shape and size. The so formed body is then sintered at elevated temperatures under suitable atmospheric conditions to form the ferrospinel structure and subsequently cooled to room temperature. However, this process suffers the disadvantage of requiring special dies for each shape of ferrite body desired. Thus, in the past, when odd shaped bodies were needed, they were cut to size from a larger ferrite disc with the ultrasonic cutter device as described in application Serial No. 431,613, now abandoned, filed on May 21, 1954, by Lloyd P. Hunter and assigned to the same assignee as the inventor of this application. In general, most toroidal shaped ferrites prepared by this method were ultrasonically cut from a completely fired ferrite disc. The magnetic properties of the ferrite bodies thus prepared have been improved by the ceramic treatment described herein.

A broad objective of this invention is to provide a convenient method of making special shaped ferrite bodies.

A more specific object of this invention is to improve the magnetic characteristics of ferrite bodies cut to shape by means of the ultrasonic cutting technique.

Among the other objects is to provide an improved method of processing ferrospinel materials so as to obtain a more nearly ideal rectangular hysteresis characteristic.

Other objectives will be pointed out in the following description and claims which disclose by way of example the principle of the invention and the best mode, which has been contemplated, of applying that principle.

Applicants have discovered that the desirable magnetic characteristics of a multipath ferrite element compressed into shape with a special die and plunger could be duplicated with ultrasonic cutting by subjecting the ferrite body to two thermal treatments, one preceding and the other following the ultrasonic cutting step.

A preferred method of preparing these bodies according to the practice of this invention comprises the steps of compressing the ferrite powders into a large disc of such a state of compactness as to enable the ultrasonic cutter to operate thereon without crumbling the body, cutting out a piece of desired shape from the disc and firing the body in the same manner as would ordinarily be employed in the processing of a pressed ferrite core. The cutting may take place on a disc which as been merely fired to a rigid state or on a disc which has been fired to complete maturity. It is found, however, that the cutting process is made easier when the unmatured ferrite slab is employed. The effect of this treatment on the B-H characteristics of square loop ferrites is illustrated by the following data in Tables I and II which compare cores of two ferrite systems made using pressed techniques with those using the ultrasonic cutting and the two stage heating process described above.

The accompanying drawing is a flow sheet illustrative of such process.

Table I

| Code No. | Sintering Procedure | Br/Bs | Knees |
|---|---|---|---|
| X-8 [1] | Pressed toroid—fired 1,200° C.—1 hr | 0.8 | Square. |
| X-8 | Ultrasonically cut from disc, fired at 1,200° C.—1 hr. | 0.5 | Round. |
| X-8 | Ultrasonically cut from disc, fired at 800° C. (½ hr) and refired at 1,200° C. for 1 hour. | 0.8 | Square. |

[1] Cadmium-manganese ferrite (20 mol percent CdO, 40 mol percent MnO, 40 mol percent $Fe_2O_3$).

Table II

| Code No. | Sintering Procedure | Br/Bs | Hc (oersteds) |
|---|---|---|---|
| 301 [1] | Pressed toroid—fired 1,400° C.—1 hr | 0.90 | 1.0 |
| 301A | Ultrasonically cut from disc fired at 1,400° C. for 1 hr. | 0.88 | 1.5 |
| 301B | 301A refired for 2 hrs. at 1,100° C | 0.90 | 1.35 |
| 301U | Ultrasonically cut from disc fired at 1,400° C. for 24 hrs. | 0.88 | 1.7 |
| 301V | 301U refired 15½ hrs. at 1,450° C | 0.90 | 0.5 |
| 301X | 301V refired 1 hr. at 1,450° C | 0.90 | 0.4 |

[1] Magnesium-manganese ferrite (37.5 mol percent MgO, 22.5 mol percent MnO, 40 mol percent $Fe_2O_3$).

The data shows that the additional heating step produces a ferrite having a higher Br/Bs ratio, squarer knees and lower coercive force than the untreated ultrasonically cut ferrite body. The results obtained using the method of this invention also compare favorably with those obtained from die pressed toroids with the single sintering process.

From consideration of the ceramic processes involved, applicants have conceived the following theoretical explanation for the effectiveness of this process. This hypothesis assumes that the ultrasonic cutting step relieves internal strains in the material in the outer regions of the core where the cutting has occurred. The present process permits these strains in the "skin" region to develop during the additional period of heating. Since it is this "skin" region of the core which plays such an important role in determining the actual operating characteristics of the ferrite, it is observed that the magnetic properties of the bodies thus treated have improved significantly.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a method of making ferrite bodies for computer type mechanisms forming a mixture of $Fe_2O_3$ and other selected bivalent metal oxides, die pressing the mixture into a thin disc, heating said disc until it assumes a rigid state, ultrasonically cutting a body of desired shape from said disc; the step of thereafter subjecting said body to an additional thermal treatment at 1000–1500° C. for 1–24 hours.

2. In a method of making ferrite bodies for computer type mechanisms forming a mixture of cadmium oxide, manganese oxide and ferric oxides; die pressing the mixture into a thin disc; heating said disc until it assumes a rigid state; ultrasonically cutting a body of the desired shape from said disc; the step of thereafter subjecting said body to an additional thermal treatment at 1000–1500° C. for 1–24 hours.

3. In a method of making ferrite bodies for computer type mechanisms forming a mixture of 20 mol percent CdO, 40 mol percent MnO and 40 mol percent $Fe_2O_3$; die pressing the mixture into a thin disc; heating said disc at about 800° C. for 30 minutes; ultrasonically cutting a body of desired shape from said disc; the step of thereafter subjecting said body to an additional thermal treatment at about 1200° C. for one hour.

4. In a method of making ferrite bodies for computer type mechanisms forming a mixture of 20 mol percent CdO, 40 mol percent MnO and 40 mol percent $Fe_2O_3$; die pressing the mixture into a thin disc; heating said disc at about 1200° C. for one hour; ultrasonically cutting a body of desired shape from said disc; the step of thereafter subjecting said body to an additional thermal treatment at about 1200° C. for one hour.

5. In a method of making ferrite bodies for computer type mecranisms forming a mixture of manganese oxide, magnesium oxide and ferric oxide; die pressing the mixture into a thin disc; heating said disc until it assumes a rigid state; ultrasonically cutting a body of the desired shape from said disc; the step of thereafter subjecting said body to an additional thermal treatment at 1000–1500° C. for 1–24 hours.

6. In a method of making ferrite bodies for computer type mechanisms forming a mixture of 37.5 mol percent MgO, 22.5 mol percent MnO and 40 mol percent $Fe_2O_3$; die pressing the mixture into a thin disc; heating said disc at about 1400° C. for one hour; ultrasonically cutting a body of the desired shape from said disc; the step of thereafter subjecting said body to an additional thermal treatment at 1100° C. for two hours.

References Cited in the file of this patent
UNITED STATES PATENTS

| | | |
|---|---|---|
| 1,669,644 | Andrews | May 15, 1928 |
| 1,981,468 | Roseby | Nov. 20, 1934 |
| 2,535,025 | Albers-Schoenberg | Dec. 26, 1950 |
| 2,580,716 | Balamuth | Jan. 1, 1952 |

FOREIGN PATENTS

| | | |
|---|---|---|
| 146,062 | Australia | Apr. 22, 1948 |
| 570,347 | Great Britain | July 3, 1945 |
| 685,065 | Great Britain | Dec. 31, 1952 |